United States Patent [19]

Naegeli

[11] 3,894,088

[45] July 8, 1975

[54] 1-ISOPROPENYL-SPIRO[4,5]DEC-6-EN-8-ONES AND A PROCESS FOR PRODUCING THEM

[75] Inventor: Peter Naegeli, Wettingen, Switzerland

[73] Assignee: Givaudan Corporation, Clifton, N.J.

[22] Filed: Nov. 7, 1973

[21] Appl. No.: 413,471

[30] Foreign Application Priority Data
Nov. 15, 1972 Switzerland........................ 16606/72

[52] U.S. Cl.......... 260/586 C; 252/522; 260/586 R; 260/586 P; 260/586 G; 260/598; 260/617 E; 260/617 C
[51] Int. Cl....................... C07c 49/44; C07c 45/00
[58] Field of Search............ 260/586 R, 587, 586 C, 260/586 G

[56] References Cited
OTHER PUBLICATIONS

Fassnacht et al., "J. Org Chem.", Vol. 27, pp. 1885–1887 (1962).

Isol et al., "Chem. Abstracts", Vol. 52, pp. 4510–4511 (1958).

Isoe et al., "Chem. Abstracts", Vol. 60 pp. 15766–15767 (1964).

Hikino et al., "Tetrahedron", Vol. 27, pp. 4831–4836 (1971).

Marshall et al., "J. Am. Chem. Soc.", Vol. 89, pp. 2750–2751 (1967).

*Primary Examiner*—Bernard Helfin
*Assistant Examiner*—Norman Morgenstern
*Attorney, Agent, or Firm*—Thomas Cifelli, Jr.

[57] ABSTRACT

Novel spiro compounds, a process for making them and odorant compositions containing the novel compounds are disclosed.

8 Claims, No Drawings

1-ISOPROPENYL-SPIRO[4,5]DEC-6-EN-8-ONES AND A PROCESS FOR PRODUCING THEM

FIELD OF THE INVENTION

This invention relates to the fields of new chemicals and odorant compositions.

SUMMARY OF THE INVENTION

The spiro compounds provided by the present invention have the following general formula

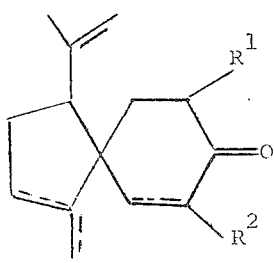

(I)

wherein $R^1$ and $R^2$ each independently represent a hydrogen atom or a lower alkyl group and one of the three broken lines denotes an additional bond.

Examples of spiro compounds falling within formula I are 1-isopropenyl-4-methyl-spiro [4,5]dec-6-en-8-one, 1-isopropenyl-4-methyl-spiro[4,5]dec-3-en-8-one and 1-isopropenyl-4-methylene-spiro[4,5]decan-8-one.

The term "lower alkyl" is used in this description and in the accompanying claims to mean straight-chain and branched-chain groups containing 1–6 carbon atoms (e.g. methyl, ethyl, propyl, isopropyl or tert.butyl). A preferred lower alkyl group is the methyl group.

According to the process provided by this invention, the spiro compounds of formula I are manufactured by cyclising a cyclopentene derivative of the general formula

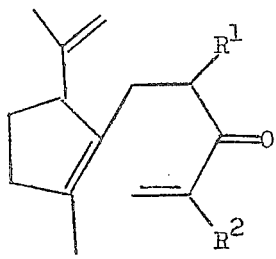

(II)

wherein $R^1$ and $R^2$ have the significance given earlier, in an organic solvent in the presence of a Lewis acid.

DESCRIPTION OF THE PREFERRED EMBODIMENTS

Suitable Lewis acids which can be used are the usual halides, preferably tin tetrachloride and titanium tetrachloride. Examples of inert organic solvents in which the cyclisation can be carried out are dioxane, diethyl ether, benzene, toluene and nitromethane. Depending on the solvent, the cyclisation can be carried out within a wide temperature range between −40°C and the reflux temperature of the mixture, preferably between 0°C and room temperature.

The working up of the cyclisation mixture and the isolation and purification of the spiro compounds of formula I can be carried out according to known methods. The purification is preferably carried out by chromatography on silica gel, but it can also be carried out by distillation.

The cyclopentene derivatives of formula II can be prepared by oxidising a compound of the general formula

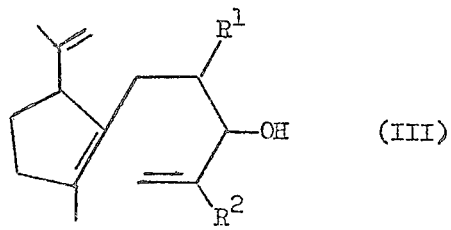

(III)

wherein $R^1$ and $R^2$ have the significance given earlier.

The oxidation can be carried out in a manner known per se according to methods which are generally known for the oxidation of allylic hydroxy groups. Examples of oxidising agents which can be used are chromic acid (in its various forms such as, for example, Jones reagent), activated manganese dioxide, $SO_3$ (preferably as the pyridine complex in the presence of dimethyl sulphoxide and triethylamine), silver oxide or silver carbonate in the presence of diatomaceous earth. The working up of the oxidation mixture as well as the purification of the spiro compounds of formula I can be carried out according to customary methods.

The compounds of formula III can be prepared in a manner known per se from a compound of the general formula

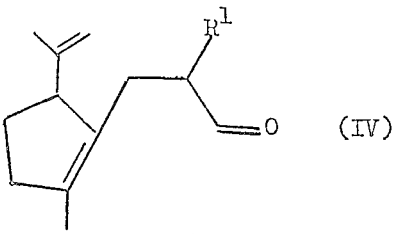

(IV)

wherein $R^1$ has the significance given earlier by reaction with an organometallic compound, especially with an alkali metal acetylide or with a Grignard compound of the general formula

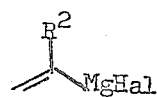

wherein $R^2$ has the significance given earlier and Hal represents a chlorine or bromine atom.

When a compound of formula IV is reacted with an acetylide it is necessary to catalytically partially hydrogenate the initially obtained compound of the general formula

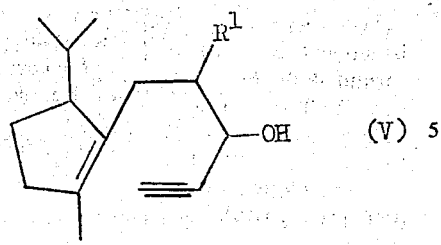

(V)

wherein R¹ has the significance givern earlier,
in a manner known per se; for example, in the presence of a Lindlar catalyst (Pd/CaCO₃ deactivated with PbO).

Insofar as they are not known, the compounds of formula IV can be prepared, for example, by reacting 3-isopropenyl-1-methyl-2-methylene-cyclopentan-1-ol with a vinyl ether of the general formula

(VI)

wherein R¹ has the significance given earlier and R represents an alkyl group.

The spiro compounds of formula I possess particular fragrance properties, especially in the foreground is a woody basic note. They can accordingly be used as odorants in perfumery; for example, in the manufacture or for the modification of the fragrance of odorant compositions such as perfumes, perfume bases, etc by addition of olfactory perceptible amounts (e.g. 0.1–10 wt %) to mixtures of known odorants. The spiro compounds of formula I can be used alone or in the form of odorant compositions for the perfuming of technical and cosmetic products of all types; for example, of solid and liquid detergents, synthetic washing agents, aerosols, soaps, creams, lotions, etc in concentrations of, for example, about 0.001–0.1 wt %. They can also be used as starting materials for the manufacture of other odorants.

The following Examples illustrate the process provided by the present invention:

EXAMPLE 1

A solution of 4 g of 3-isopropenyl-1-methyl-2-(3-oxo-4-pentenyl)-1-cyclopentene in 150 ml of absolute benzene and 50 ml of absolute ether was treated at 0°C with strong stirring with 60 ml of a 0.5-M benzene solution of tin tetrachloride during 30 minutes. The mixture was stirred for a further 30 minutes at 0°C and 2 hours at room temperature and then poured into an excess of ice-cold sodium carbonate solution. After extraction with ether, the working up of the extract in the usual manner yielded 3.5 g of a light brown oil which was chromatographed on a 25-fold amount by weight of silica gel. By elution with hexane/ether (19:1) and distillation under reduced pressure, 2 g of pure 1-isopropenyl-4-methyl-spiro[4,5]dec-6-en-8-one (mixture of 2 isomers) were obtained;

b.p.$_{0.001}$ ~ 65°C;
UV (ethanol) : $\lambda_{max}$ = 229 nm ($\epsilon$ = 8050);
IR (film) : $\nu$ = 3120, 1685, 1645, 1618, 1450, 1420, 1390, 1380, 1350, 1330, 1265, 1235, 1185, 1155, 1142, 895, 865 cm⁻¹.

Odour : earthy, woody, camphoraceous.

The starting material was prepared as follows:

A solution of 20 g of 2-(3-hydroxy-4-pentenyl)-3-isopropenyl-1-methyl-1-cyclopentene in 1000 ml of acetone was mixed with 40 ml of Jones reagent with stirring at −10°C during 20 minutes. The mixture was stirred for a further 5 minutes at −5°C, poured on to ice-cold excess 2-N soda solution and extracted with ether. The extract was worked up in the usual manner and yielded 18.5 g of a bright yellow oil which, after distillation under reduced pressure, gave 16 g of pure 3-isopropenyl-1-methyl-2-(3-oxo-4-pentenyl)-1-cyclopentene;

b.p.$_{0.001}$ ~ 48°C;
IR (film) : $\nu$ = 3100, 1700/1685, 1645, 1620, 1442, 1402, 1375, 1100, 990, 968, 895 cm⁻¹.

EXAMPLE 2

A solution of 1.3 g of 3-isopropenyl-1-methyl-2-(2-methyl-3-oxo-4-pentenyl)-1-cyclopentene in 60 ml of absolute benzene and 10 ml of absolute ether was treated at 0°C with strong stirring with 18 ml of a 0.5-M benzene solution of tin tetrachloride during 30 minutes. The mixture was stirred for a further 30 minutes at 0°C and 1.5 hours at room temperature and then poured into an excess of ice-cold soda solution. After extraction with ether, the working up of the extract in the usual manner yielded an oily product from which there was isolated, by distillation under reduced pressure and chromatography on silica gel, pure 1-isopropenyl-4,9-dimethyl-spiro[4,5]dec-6-en-8-one (mixture of 2-isomers);

b.p.$_{0.005}$ = 80°C;
UV (cyclohexane) : $\lambda_{max}$ = 212 nm ($\epsilon$ = 5750) and 230 nm ($\epsilon$ = 4650);
IR (film) : $\nu$ = 3110, 1682, 1645, 1625, 1455, 1378, 1200, 1145, 895, 818 cm⁻¹.

Odour : camphoraceous, woody, earthy.

The starting material was prepared in a manner analogous to that described in Example 1, from 2-(3-hydroxy-2-methyl-4-pentenyl)-3-isopropenyl-1-methyl-1-cyclopentene;

b.p.$_{0.02}$ = 84°C;
UV (cyclohexane) : $\lambda_{max}$ 32 213 nm ($\epsilon$ = 9500);
IR (film) : $\nu$ = 3100, 1702, 1682, 1645, 1615, 1455/40, 1405, 1375, 1030, 990, 975, 892 cm⁻¹.

EXAMPLE 3

A solution of 1 g of 3-isopropenyl-1-methyl-2-(2,4-dimethyl-3-oxo-4-pentenyl)-1-cyclopentene in 40 ml of absolute nitromethane and 8 ml of absolute ether was treated at −25°C with 13.5 ml of a 0.5-M solution of titanium tetrachloride in nitromethane. After stirring for 1.5 hours at −15°C, the reaction solution was poured into an excess of ice-cold soda solution and the mixture worked up as described in Example 2. There was obtained pure 1-isopropenyl-4,7,9-trimethyl-spiro[4,5]-dec-3-en-8-one;

b.p.$_{0.02}$ = 90°C;
IR (film) : $\nu$ = 3100, 3080, 1715, 1680, 1642, 1455, 1375, 895 cm⁻¹.

Odour: woody cedar-like, earthy, slightly camphoraceous.

The starting material was prepared in a manner analogous to that described in Example 1, from 2-(3-hydroxy-4-methyl-4-pentenyl)-3-isopropenyl-1-methyl-1-cyclopentene;

b.p.$_{0.01}$ = 88°C;

UV (cyclohexane) : $\lambda_{max}$ = 213 nm ($\epsilon$ = 9900);

IR (film) : $\nu$ = 3110, 1680, 1645, 1450, 1375, 1090, 935, 895 cm$^{-1}$.

EXAMPLE 4

In a manner analogous to that described in Example 3, there were obtained from 1.3 g of 3-isopropenyl-1-methyl-2-(4-methyl-3-oxo-4-pentenyl)-1-cyclopentene 0.45 g of a mixture of 1-isopropenyl-4,7-dimethyl-spiro[4,5]dec-3-en-8-one and 1-isopropenyl-7-methyl-4-methylene-spiro[4,5]decan-8-one in a ratio of 3:1;

b.p.$_{0.005}$ = 85°C;

IR (film) : $\nu$ = 3100/3080, 1715, 1642, 1455, 1438, 1378, 1235, 1185, 1135, 1108, 1030, 1010, 975, 895, 810 cm$^{-1}$.

Odour: woody, earthy, herby, green, camphoraceous.

The starting material was prepared in a manner analogous to that described in Example 1, from 2-(3-hydroxy-2,4-dimethyl-4-pentenyl)-3-isopropenyl-1-methyl-1-cyclopentene;

b.p.$_{0.01}$ = 92°C;

UV (cyclohexane) : $\lambda_{max}$ = 216 nm ($\epsilon$ = 8800);

IR (film) : $\nu$ = 3110, 1680, 1645, 1455, 1375, 935, 895 cm$^{-1}$.

The following Example illustrates an odorant composition containing a spiro compound provided by the present invention:

EXAMPLE A

Odorant composition containing 1-isopropenyl-4-methyl-spiro[4,5]dec-6-en-8-one.

|  | Parts by weight |
|---|---|
| Pine-needle oil Siberian | 150 |
| Bornyl acetate liquid | 100 |
| Resinoid pine | 50 |
| Galbanum oil | 20 |
| Coumarin | 20 |
| Sandalwood oil East Indian | 30 |
| Vetiver oil Bourbon | 10 |
| Laurinaldehyde | 50 |
| Terpineol | 50 |
| 1,1-Dimethoxy-2-phenylpropane | 20 |
| Hyacinth synthetic | 250 |
| 1-Isopropenyl-4-methyl-spiro[4,5]dec-6-en-8-one | 250 |
|  | 1000 |

This odorant composition provides a pine-like fantasy note, combined with a fragrance of hyacinths, as is favourably used in the perfuming of bath preparations. The fresh, woody note is emphasised by the content of 1-isopropenyl-4-methyl-spiro[4,5]dec-6-en-8-one.

What we claim is:

1. Spiro compounds of the general formula

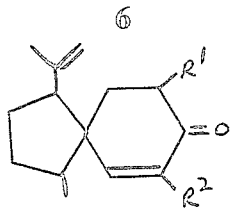

wherein $R^1$ and $R^2$ each independently represent a hydrogen atom or a lower alkyl group.

2. 1-Isopropenyl-4-methyl-spiro[4,5]dec-6-en-8-one.

3. 1-Isopropenyl-4,9-dimethyl-spiro[4,5]dec-6-en-8-one.

4. A process for the manufacture of the spiro compounds claimed in claim 1, which process comprises cyclising a cyclopentene derivative of the general formula

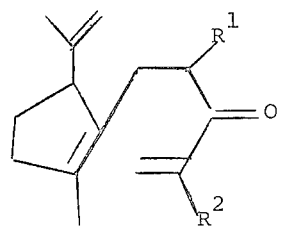

(II)

wherein $R^1$ and $R^2$ have the significance given in claim 1, in an organic solvent in the presence of a Lewis acid, said organic solvent being a member selected from the group consisting of dioxane, diethyl ether, benzene, toluene and nitromethane, said Lewis acid being a member selected from the group consisting of tin tetrachloride and titanium tetrachloride and the reaction being conducted within the range from about −40°C to reflux.

5. A process according to claim 4, wherein tin tetrachloride or titanium tetrachloride is used as the Lewis acid.

6. A process which comprises reacting 3-isopropenyl-1-methyl-2-(3-oxo-4-pentenyl)-1-cyclopentene dissolved in a mixture of benzene and ethyl ether in the presence of tin tetrachloride at a temperature within the range from about 0°C. to ambient room temperature to form 1-isopropenyl-4-methyl-spiro[4,5]dec-6-en-8-one.

7. A process which comprises reacting 3-isopropenyl-1-methyl-2-(2,4-dimethyl-3-oxo-4-pentenyl)-1-cyclopentene dissolved in a mixture of nitromethane and ethyl ether in the presence of titanium tetrachloride at a temperature within the range from about −15° to −25°C. to form 1-isopropenyl-4,7,9-trimethyl-spiro[4,5]dec-3-en-8-one.

8. A process which comprises reacting 3-isopropenyl-1-methyl-2-(4-methyl-3-oxo-4-pentenyl)-1-cyclopentene dissolved in a mixture of nitromethane and ethyl ether in the presence of titanium tetrachloride at a temperature within the range from about −15° to −25°C. to form a mixture of 1-isopropenyl-4,7-dimethyl-spiro[4,5]dec-3-en-8-one and 1-isopropenyl-7-methyl-4-methylene-spiro[4,5]decan-8-one.

* * * * *